United States Patent [19]

Grupp et al.

[11] Patent Number: 5,742,006
[45] Date of Patent: Apr. 21, 1998

[54] ELECTRIC CELL OF THE TYPE COMPRISING TWO PARALLEL PLATES OR SUBSTRATES IN PARTICULAR MADE OF PLASTIC MATERIAL SEPARATED FROM EACH OTHER BY A SEALING FRAME

[75] Inventors: Joachim Grupp, Neuchatel, Switzerland; Bernard Lemarie, Granges-les-Valences, France

[73] Assignee: Asulab S.A., Bienne, Switzerland

[21] Appl. No.: 620,312

[22] Filed: Mar. 22, 1996

[30] Foreign Application Priority Data

Mar. 24, 1995 [FR] France ................................. 95 03477

[51] Int. Cl.$^6$ ..................................................... H01L 23/28
[52] U.S. Cl. ............................. 174/52.2; 349/22; 349/31; 349/33; 349/153; 349/155
[58] Field of Search ........................................... 257/431–434; 361/323; 174/52.2; 349/22, 31, 33–34, 153–155, 190

[56] References Cited

PUBLICATIONS

Patent Abstracts of Japan vol. 016 No. 179 (P–1345), 28 Apr. 1992 & JP–A–04 020929 (NEC Corp) 24 Jan. 1992.
Patent Abstracts of Japan vol. 010 No. 223 (P–483), 5 Aug. 1986 & JP–A–61 057927 (Ricoh Co Ltd) 25 Mar. 1986.
Patent Abstracts of Japan vol. 017 No. 399 (P–1579), 26 Jul. 1993 & JP–A–05 072540 (Hitachi Ltd; Others: 01) 26 Mar. 1993.

*Primary Examiner*—Bot L. Ledynh
*Attorney, Agent, or Firm*—Griffin, Butler Whisenhunt & Szipl

[57] ABSTRACT

An electric cell comprises first and second parallel flexible substrates, set apart from each other at a determined spacing, carrying electrodes on their opposing faces, the substrates enclosing between them a layer of sensitive material which can change its physical properties, in particular its optical properties, as a result of a voltage applied to the electrodes, or change its electrical properties as a result of stress or radiation passing through one of the substrates, the sensitive material being protected from contact with the atmosphere by a sealing frame which connects, in a sealed manner, peripheral parts of the substrates, said frame having a width parallel to the substrates. The electric cell is characterised in that at least the first substrate comprises on its face opposing the second substrate at least a first continuous peripheral groove into which at least a part of the sealing frame extends, the cross-section of the sealing frame being a multiple of an area equal to the product of the width multiplied by the spacing, the thickness of the sealing frame at any point being greater than or equal to the spacing.

20 Claims, 4 Drawing Sheets

ELECTRIC CELL OF THE TYPE COMPRISING TWO PARALLEL PLATES OR SUBSTRATES IN PARTICULAR MADE OF PLASTIC MATERIAL SEPARATED FROM EACH OTHER BY A SEALING FRAME

FIELD OF THE INVENTION

The present invention concerns an electric cell of the type comprising two parallel plates or substrates joined by a sealing frame, and more particularly a cell of this type having substrates made of flexible glass or plastic.

Electric cells of this type are used in particular for making liquid crystal display devices and cells for generating energy from solar radiation.

BACKGROUND OF THE INVENTION

In the case of a liquid crystal display cell, a film of liquid crystals is sandwiched between two plates, generally made of thin glass, and electrodes are arranged on the face of each of the substrates opposite to the other substrate. These plates are joined to each other by a sealing frame arranged at the periphery of said plates. This sealing frame, formed by a line of adhesive having a width of the order of magnitude of 0.5 mm, assures the cohesion of the cell plates and the spacing between them (of the order of magnitude of 5 to 10 µm), defines a sealed chamber in which the liquid crystal film is enclosed, and assures suitable electric insulation between the electrodes of the two plates. The small spacing mentioned above is indispensable for a dynamic and efficient functioning of the cell in the sense that the spacing between the two substrates determines the volume of the liquid crystal film and consequently the light transmission characteristics, the switching speed and the operating voltage of the cell. This spacing must in particular be kept as small as possible in order to obtain a cell having a high switching speed with a low operating voltage and a high transmission level.

Certain applications of these cells, for example for variable transmission visors for helmets, require the use of cells comprising flexible plates or substrates. These flexible substrates are generally formed of plates made of plastic material, for example, polycarbonate, of small thickness, that is to say having thicknesses comprised between 1 and 1.5 mm.

Cells of this type present several problems both as regards their use and manufacture.

It has been noted that peeling of the sealing frame from the substrates frequently appeared tending to separate the substrates from each other, in particular in the corner areas of the cell, this peeling leading to irreparable degradation of the cell. This type of phenomenon appears for example when the sealing frame is subjected to significant mechanical stress for example during the separation of the cell units, which are manufactured in batches, by mechanical cutting of the sheets forming the substrates, or when the cell is mechanically pressed to achieve an electric contact with contact means or when a polarizer is glued to the cell by rolling. This peeling is explained by the combination of the small contact surface of the adhesive with the substrates, and the flexibility of the substrates, this flexibility inducing additional mechanical stress on the sealing frame in comparison to a "rigid" cell.

A solution to this peeling problem could lie in increasing the width of the sealing frame in order to obtain a satisfactory resistance of the latter to peeling. However, experiments have shown that it is necessary to multiply by at least 20 the width of the sealing frame (which is normally of the order of magnitude of 1.5 mm) to obtain a satisfactory peeling resistance. Such a solution is of course unacceptable in that it leads to a significant reduction in the active surface of the cell in relation to its total surface.

A liquid crystal display device comprising two substrates connected to each other by a sealing frame having a structure which improves the substrates peeling resistance is also known from patent application JP 5 072 540. According to this document, a coloured filter in an organic material is applied between a substrate and the sealing frame, the material of the coloured filter comprising recessed parts which the sealing frame enters so that the contact surface between the sealing frame and said substrate can be increased. However, the volume of the sealing frame remains virtually constant, and the increase in cohesion is not improved so that there is a significant risk of rupture of the cohesion of the sealing frame material, in particular within the framework of the applications mentioned above.

Document JP 4 020 929 discloses an alternative solution to that presented in document JP 5 072 540. According to this document, recesses and projections having a depth of 1 µm are provided like a frame in the external peripheral surface of a first substrate. The material intended to form the sealing frame is deposited on the first substrate in the area of the recesses and projections. A second substrate is formed in the same way and is superposed on the first substrate so that the recessed parts of the first substrate face the projecting parts of the second substrate and pressure is applied to the latter, the distance between the two substrates being kept constant with the aid of spacers in the shape of beads having a diameter of 6 mm. Taking account of the small depth of the recesses arranged in the substrates, the teaching of this document consists only of increasing the surface of the sealing frame material in contact with the substrates. Consequently, the cohesion of the sealing frame has not increased according to this construction and presents the same disadvantages as the cell disclosed in document JP 5 072 540.

Patent application JP 61 057 927 discloses a liquid crystal display cell comprising two substrates attached together by means of a sealing frame. According to this document, the cohesion between the two substrates is reinforced by extending the material of the sealing frame into through holes which are provided at regular intervals in one or both substrates. This presents the major disadvantage of only reinforcing the cohesion locally, leaving the cell with zones of fragile cohesion between the holes. Furthermore, the preparation of substrates comprising holes has disadvantages in particular during the deposition of the various layers required for the manufacture of the cells.

Another solution could consist of increasing the thickness of the sealing frame, however this would lead to a corresponding increase in the spacing between the substrates with the consequences mentioned above.

Another problem, appearing during the manufacture of this type of cell, lies in the difficulty of controlling the thickness of the line of adhesive which forms the sealing frame when it is deposited, before the assembly of the substrates. A variation in spacing between the substrates of approximately 0.1 µm generates a defect visible to the naked eye at the surface of the cell, in particular close to the sealing frame. Failure to control the thickness of the sealing frame is thus detrimental to the cell display quality.

Electric cells with flexible substrates thus present significant problems of reliability which require reduction or removal.

SUMMARY OF THE INVENTION

A principal object of the invention is thus to overcome the aforementioned disadvantages of the prior art by providing an electric cell of the type comprising two plates or substrates joined by a sealing frame which is simple and economical to assemble and in which the risk of degradation by peeling of the substrates when the cell is subjected to normal service stress is considerably reduced or removed, these objects being achieved without altering the operating capacity of the cell, in particular without increasing the spacing between the substrates and without reducing the active surface of the cell.

The invention thus concerns an electric cell of the type comprising a first and a second parallel flexible substrates, set apart from each other at a determined spacing, carrying electrodes on their opposing faces, these substrates enclosing between them a layer of sensitive material which can change its physical properties, in particular its optical properties, as a result of a voltage applied to the electrodes, or change its electrical properties as a result of stress or radiation passing through one of the substrates, said sensitive material being protected from contact with the atmosphere by a sealing frame which connects, in a sealed manner, peripheral parts of said substrates, said sealing frame having a width parallel to the substrates, characterised in that at least the first substrate comprises on its face opposing the second substrate at Least a first continuous peripheral groove into which at Least a part of said sealing frame extends, the cross-section of the sealing frame being a multiple of an area equal to the product of said width multiplied by said spacing, the thickness of the sealing frame at any point being greater than or equal to said spacing.

As a result of these features, not only is the surface of the substrates in contact with the adhesive, and thus the peeling resistance of the substrates significantly increased without increasing either the width of the sealing frame or the spacing between the substrates, but also the volume of adhesive between the two substrates is increased over the entire periphery of the cell. This also contributes to reducing the risk of the active material leaking. The structure of the cell according to the invention also advantageously removes the necessity of delicately controlling the deposition of a very small volume of adhesive to form the sealing frame as was the case in the prior art, since the volume of adhesive deposited in the base of the groove or grooves is now greater and has a significant volume for expansion before penetrating the active zone of the cell.

According to an advantageous feature of the invention, the cell includes, in the internal zone delimited by the sealing frame and between the substrates, spacers which determine the spacing between the substrates.

The precise spacing between the substrates is thus assured by the size of the spacers which may have the shape of beads or fibbers.

Other advantages and features of the invention will appear upon reading the detailed description which follows of embodiment examples given by way of illustrative and non limiting example in conjunction with the attached drawings.

DESCRIPTION OF PREFERRED EMBODIMENTS

The detailed description of the invention which follows will be made within the framework of an application to a liquid crystal display electric cell, but it is understood that the invention is no way limited to this application and that the principles of the invention are applicable in particular to other types of electric sells such as, for example, electric cells for generating electric energy from solar radiation.

Figure 1:
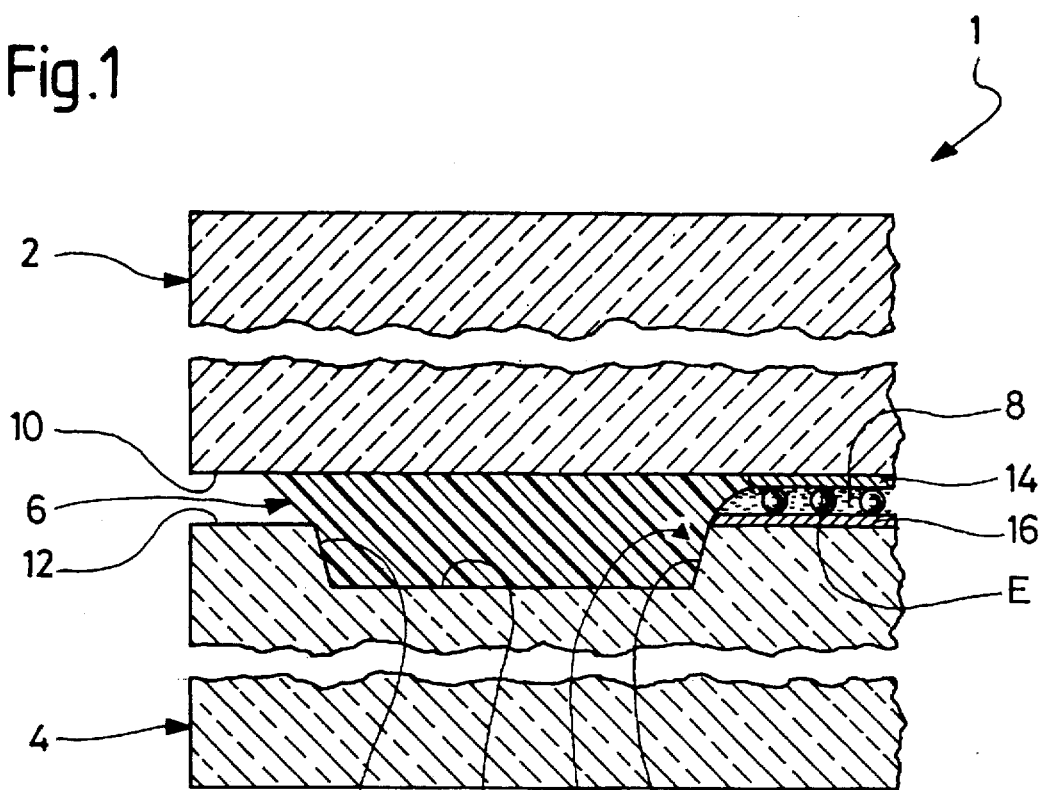
FIGS. 1 to 7 are partial cross-sectional views of different embodiments of an electric cell in conformity with the invention.

Referring first of all to FIG. 1, one sees a first embodiment of a liquid crystal cell according to the invention which is designated by the general numerical reference 1.

Cell 1, of which only a peripheral part is shown in cross-section in the drawing, comprises in a known manner an upper substrate 2 and a lower substrate 4, substrates 2 and 4 being made of a flexible material, for example plastic, such as a polycarbonate.

Upper substrate 2 and lower substrate 4 are joined via a sealing frame 6, formed for example of a polymerizable adhesive. The sealing frame forms a closed contour along the edges of substrates 2 and 4 and delimits the active zone of cell 1. Sealing frame 6 is connected in a sealed manner to substrates 2 and 4 and defines with the latter a sealed volume in which a film of liquid crystals 8 is enclosed. Substrates 2 and 4 carry respectively on their opposing faces 10, 12 upper electrodes 14 and lower electrodes 16 which have a predetermined configuration. These electrodes are made of a conductive material, for example in "ITO" transparent conductive material (indium and tin oxide). Electrodes 14 and 16 are connected respectively to external contacts (not shown) necessary for the operation of the cell in a manner well known to the man skilled in the art.

Cell 1 comprises, in addition, spacers E having the shape of beads or fibbers arranged between the substrates in the active zone of the cell, said spacers, which are put in place before the assembly of substrates 2 and determine the spacing between opposing faces 10 and 12 of the substrates.

It will be noted in this regard that the drawing does not reflect the exact thickness of the different elements of the cell and that the thicknesses are greatly exaggerated for greater clarity. In order to give a clearer idea, the distances between faces 10 and 12 is of the order of magnitude of 5 to 10 μm, and the thickness of substrates 2 and 4 is of the order of magnitude of 1 to 1.5 mm.

Figure 8:
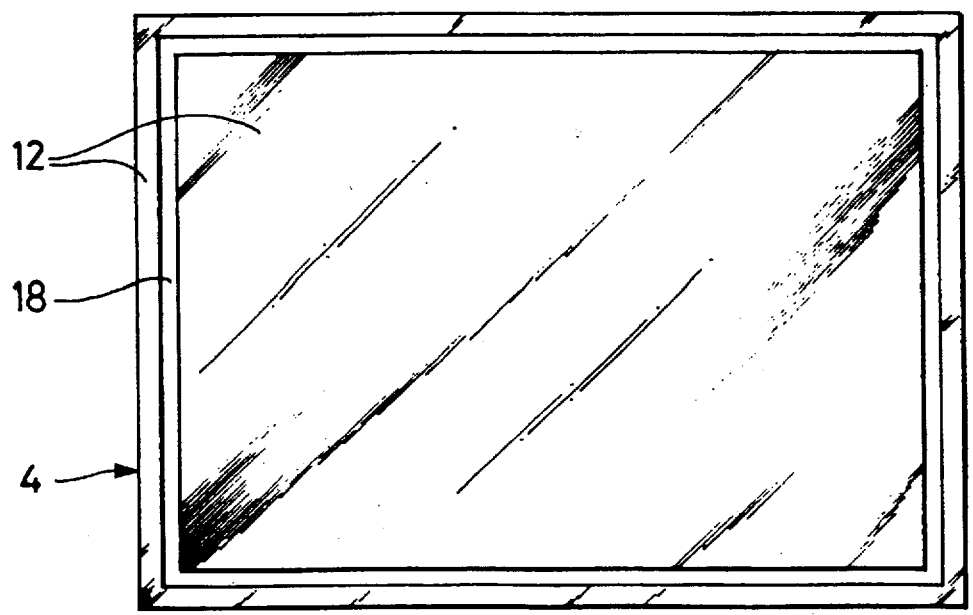
FIG. 8 is a top view of one of the substrates of the cell shown in FIG. 2.

According to a first embodiment of the invention and referring to FIGS. 1 and 8, lower substrate 4 comprises, etched into its face 12, a continuous peripheral groove which sealing frame 6 penetrates, while upper substrate 2 has a flat surface in the zone facing groove 18.

Groove 18 preferably has positive sloping lateral walls 20, or in other words, which flare outwards. The flaring of walls 20 enables the flow of the adhesive to be preoriented during assembly of the substrates and limits the pinching effect which tends to move the adhesive abruptly to the sides of the groove and in particular into the active zone or even towards the inside of the cell during the assembly of substrates 2 and 4. The profile of base 22 of the groove may be of any shape.

It will be noted in this regard that the material which forms the sealing frame does not fill the whole groove and does not flow over the sides of the latter.

The width of this groove is preferably substantially equal to that of the sealing frames of cells of the prior art but could, if required, be smaller if the depth of the groove is increased in an appropriate manner. By way of example, the width of the groove is preferably between 0.5 and 1 mm and the depth of the groove is between 0.15 and 0.2 mm.

In any case and according to a feature of the invention, the transversal section S of the sealing frame is a multiple, preferably greater than or equal to 2 and most preferably between 5 and 7, of an area value A equal to the product of the width L of the sealing frame multiplied by the spacing E between the substrates, the thickness of the sealing frame at any point being greater than or equal to said spacing.

In the framework of the example shown in FIG. 1, with a cell having a spacing of 5 µm between the substrates, and a frame width of the order of magnitude of 500 µm, a groove depth P of the order of magnitude of 150 µm enables a transversal section S of 7,500 µmm$_2$ to be obtained which corresponds to three times area A=L×E=500.5=2,500 µm$^2$.

The presence of this groove thus enables the sealing frame surface in contact with the substrates to be increased and thus the adhesion of the latter to the frame to be increased. This groove also enables the sealing frame volume to be increased and thus the cohesive strength between the substrates to be increased. These two increases do not affect the width of the sealing frame.

According to an advantageous feature of the invention, lateral walls 20 and base 22 of groove 18 are treated with the aid of an oxygen or nitrogen plasma or with a mixture of carbon tetrafluoride and oxygen to increase their wettability and thus to facilitate the flow of the adhesive along the surfaces of the lateral walls and the base during assembly of the substrates.

Groove 18 may be obtained directly by injection moulding when substrates made of a plastic material are used or by conventional etching when glass substrates are used.

FIGS. 2 to 8 show other alternative embodiments of a cell according to the invention in which those elements which are identical to those described in connection with FIG. 1 are designated by the same numerical references.

Figure 2:
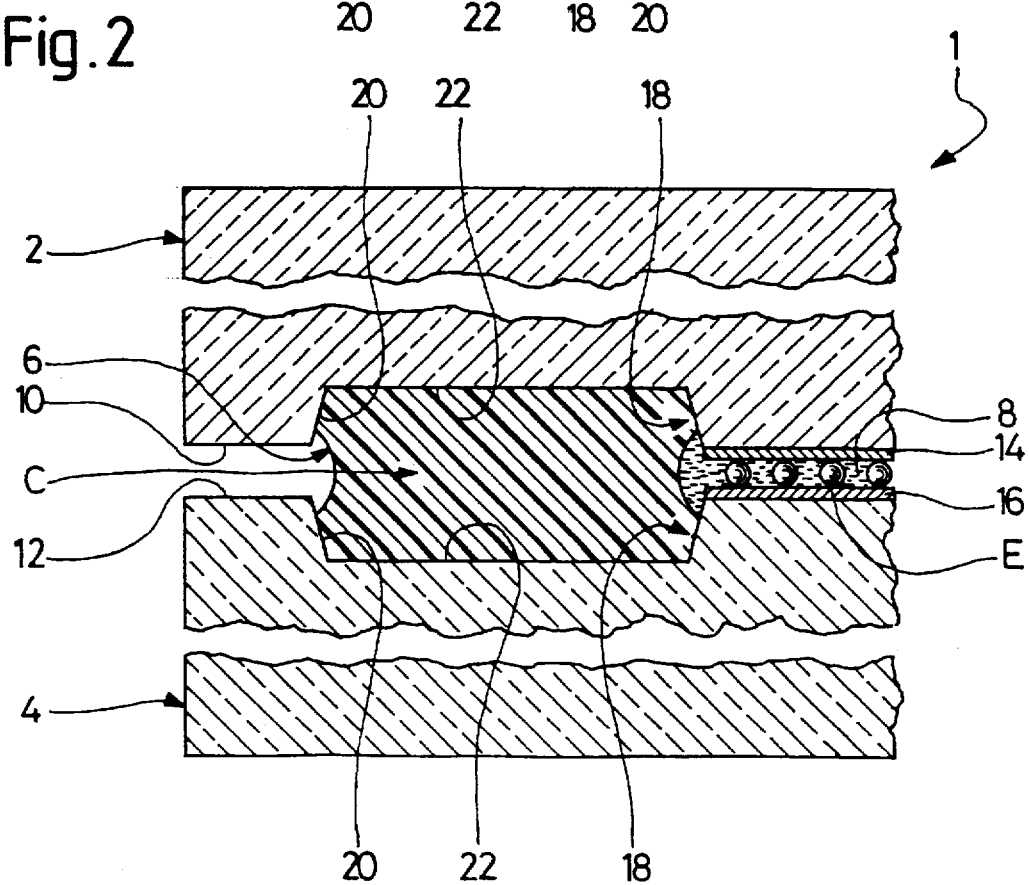

In particular FIG. 2 shows an alternative embodiment of the cell shown in FIG. 1 in which upper substrate 2 also comprises a groove 18 identical to that arranged in lower substrate 4, and arranged substantially facing the latter. Thus, when the substrates are assembled, grooves 18 respectively of each of the substrates define a channel C which sealing frame 6 penetrates.

It will be noted that this embodiment advantageously offers a contact surface of substrates 2 and 4 with the adhesive which forms sealing frame 6 which is about two times greater than in the case of the first embodiment, which of course increases the strength of the substrate assembly.

By way of indication, the assembly of substrates 2 and 4 of the embodiments described above may be achieved by the simple deposition of an appropriate quantity of adhesive in groove 18 of one of substrates 2 and 4 and by the conventional application of one of the substrates onto the other, while assuring, in the case of the alternative embodiment described in FIG. 2, that the grooves are substantially facing the spacers which have previously been arranged on one of the substrates.

Figure 3:
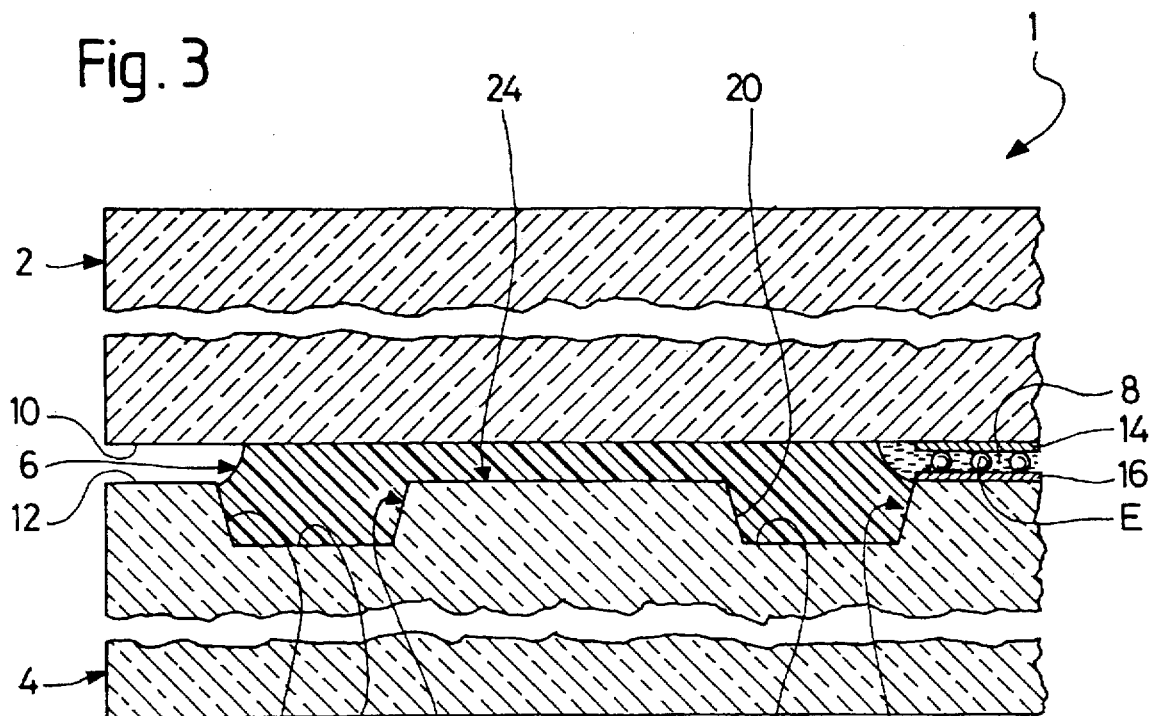

Referring now to FIG. 3, a second embodiment is shown, in which the upper substrate is identical to the upper substrate shown in the FIG. 1 cell, and in which lower substrate 4 comprises two continuous peripheral grooves 18 having substantially parallel contours. In this embodiment, grooves 18 are separated from each other by a flat portion or strip 24 of face 12, this strip 24 being at substantially the same level as face 12 of substrate 4. As is shown by the drawing, sealing frame 6 penetrates in this case both grooves 18 and the space delimited between strip 24 and the opposing part of upper substrate face 12.

Preferably, and in order to assure a strong substrate assembly, sealing frame 6 extends continuously in these spaces and fills them completely.

It will be noted that in an advantageous manner, grooves 18 and strip 24 have a substantially identical width, and preferably, the sum of the respective widths of the grooves and the strip is approximately equal to the width of the sealing frames of the cells of the prior art.

Figure 4:
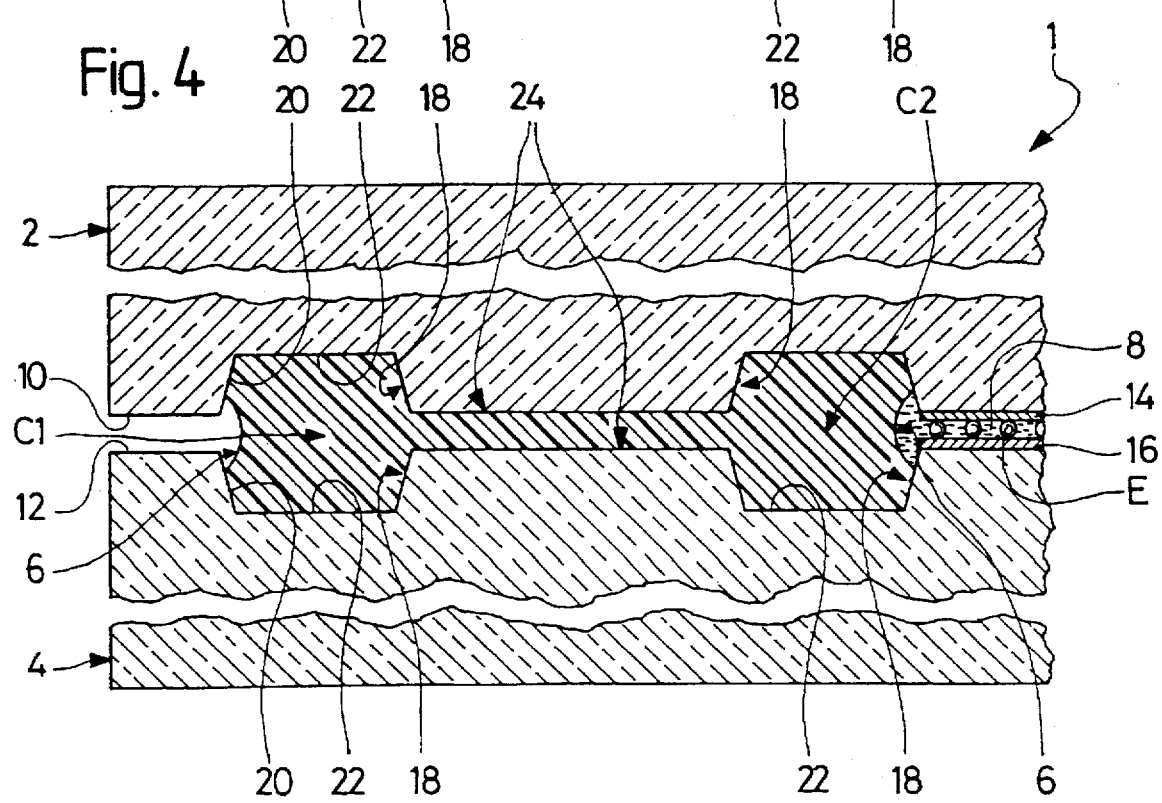

FIG. 4 shows an alternative embodiment of the cell shown, in which upper substrate 2 is identical to the lower substrate and thus comprises two grooves 18 arranged respectively substantially facing those of lower substrate 4. Thus, when substrates 2 and 4 are assembled, the pairs of grooves 18 of the lower and upper substrates define pairs of channels C1 and C2 which sealing frame 6 penetrates.

This alternative embodiment enables the contact surface of the substrates with the sealing frame and thus the substrate assembly strength to be further increased without also having to increase the width of sealing frame 6.

In the embodiments of FIGS. 3 and 4, the assembly is preferably achieved by depositing the appropriate quantity of adhesive onto strip 24 of one or both of the substrates as the case may be and the substrates are conventionally applied against each other, while assuring, in the case of the alternative embodiment described in FIG. 4, that the grooves are substantially facing each other, the spacers E having of course been previously arranged on one of the substrates. Once substrates 2 and 4 are assembled, the adhesive fills the whole of the volumes delimited by grooves 18.

Figure 5:
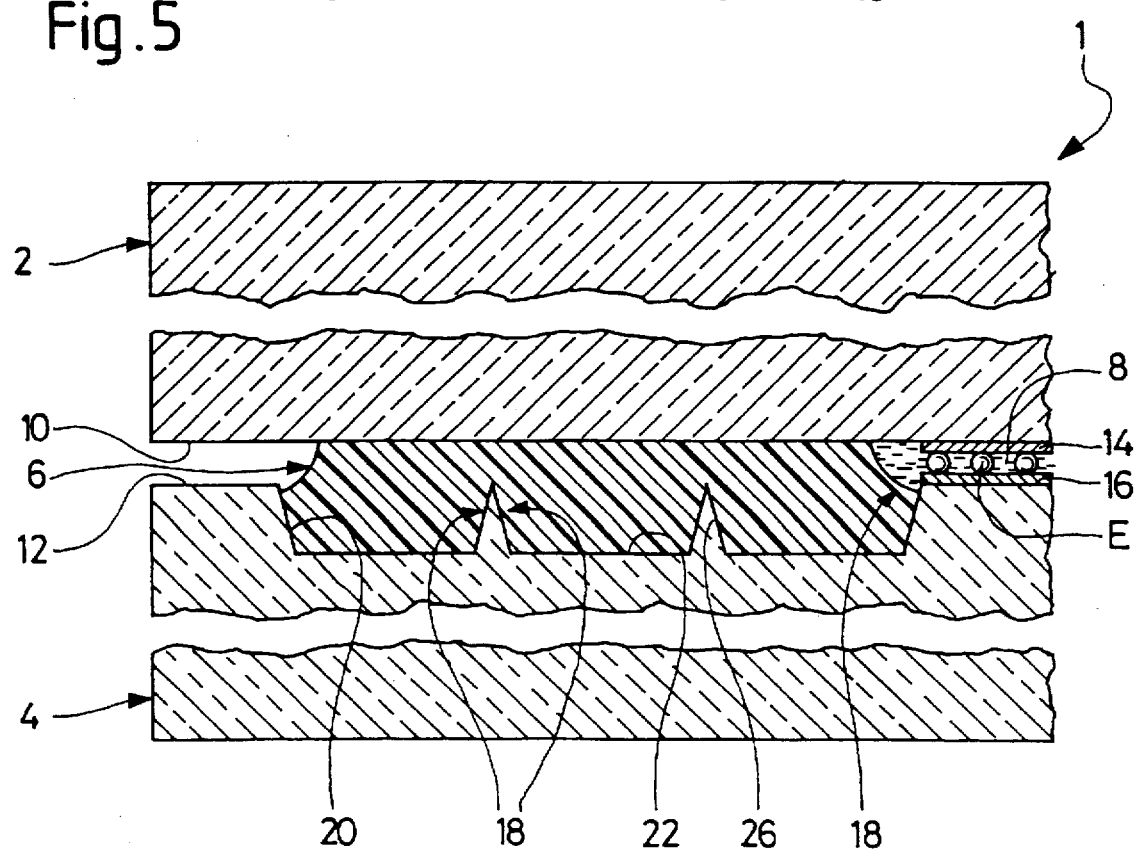

FIG. 5 shows a cell according to a third embodiment of the invention in which upper substrate 2 is identical to upper substrate 2 shown in FIG. 1 and in which lower substrate 4 comprises three contiguous, continuous peripheral grooves 18 having substantially parallel respective contours. These grooves 18 all have the same straight cross-section and are thus separated from each other by ribs 26 with a triangular cross-section.

Figure 6:
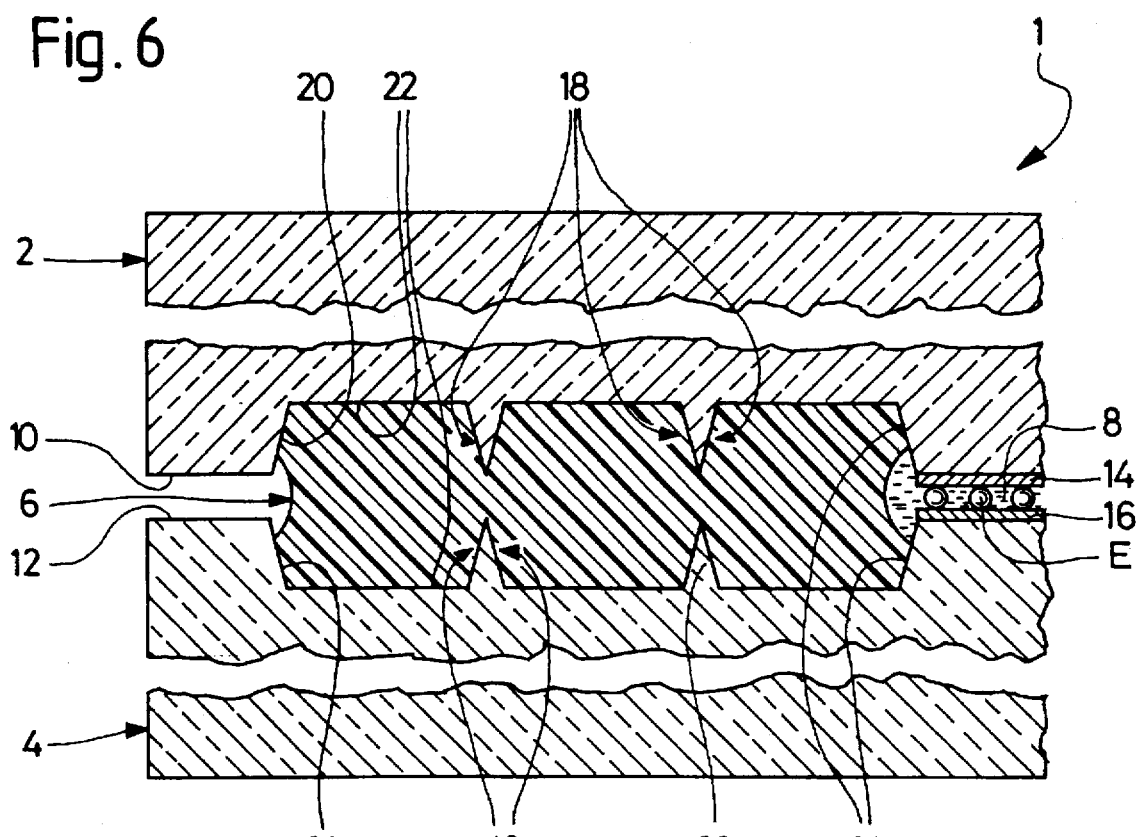

FIG. 6 shows a variation of the embodiment of FIG. 5 in which upper substrate 2 is identical to lower substrate 4, grooves 18 of upper substrate 2 being arranged substantially facing those of lower substrate 4.

The assembly of substrates 2 and 4 of the embodiments of FIGS. 5 and 6 is identical to that described in connection with FIGS. 3 and 4 with the exception that the adhesive is deposited in the central groove or grooves.

It goes without saying that in order to obtain a substrate assembly with optimum strength the volume of adhesive forming sealing frame 6 must be such that it fills the entire volume defined by grooves 18 without, however, overflowing into the active surface of the cell.

Figure 7:
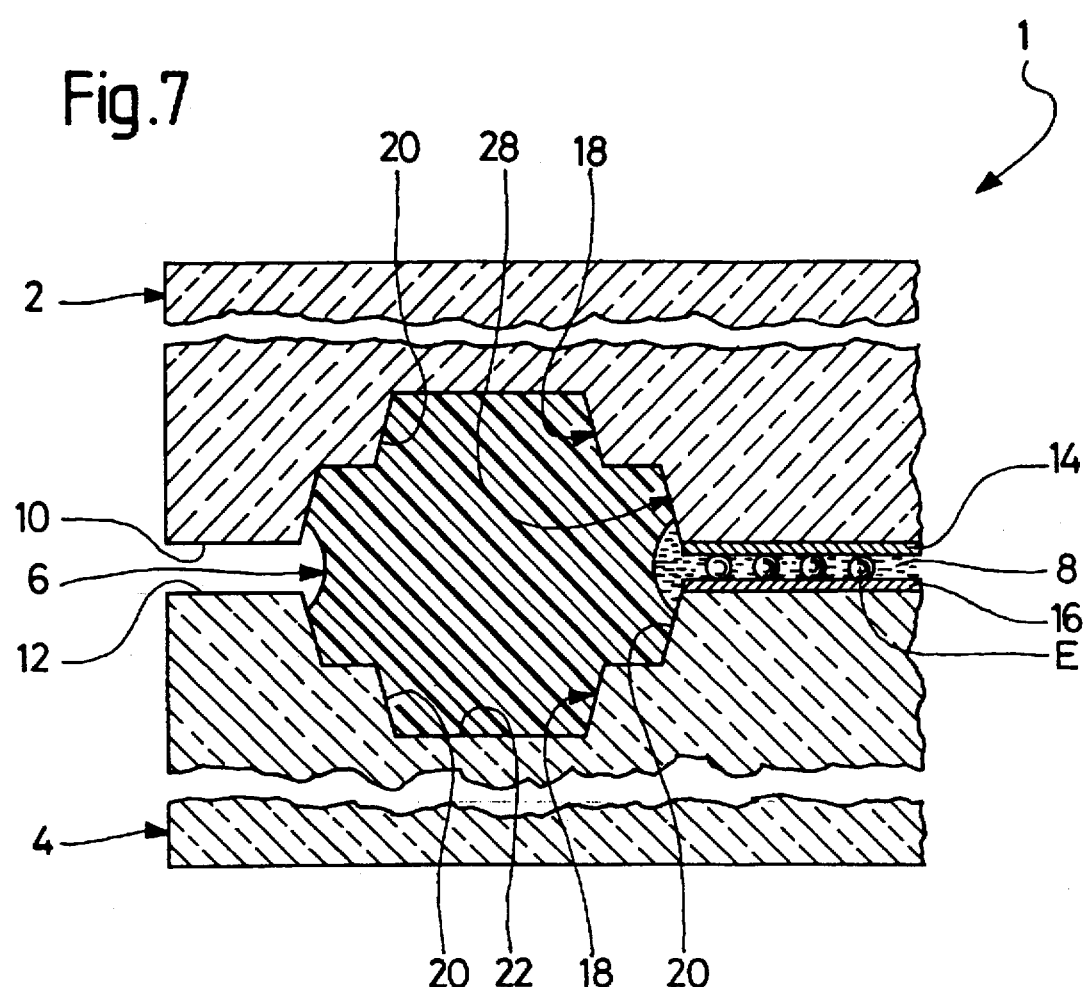

FIG. 7 shows a fourth embodiment of the invention in which the two substrates 2 and 4 each comprise two superposed, continuous peripheral grooves 18, 28, shallower groove 28 having a greater width than that of deeper groove 18, the grooves of substrate 2 being arranged facing grooves 18, 28 of the other substrate 4.

As in the other embodiments, sealing frame 6 extends into these grooves 18, 28. In an advantageous manner, the additional volume created by groove 28 constitutes an expansion volume into which, if required, the surplus of adhesive forming sealing frame 6 may flow during the assembly of substrates 2 and 4. This thus prevents the active zone being polluted by the adhesive in the event that an excessive volume of adhesive is deposited in groove 18.

It will be noted, in an advantageous manner, that the embodiments shown in FIGS. 2 to 7 offer a large contact surface of substrates 2 and 4 with the adhesive which forms sealing frame 6.

Ideally, and for all the alternative embodiments which have just been described, the total volume of adhesive deposited in one and/or both of grooves 18 is determined in such a way that once the substrates are assembled the volume of grooves 18 is totally filled without, however, the adhesive overflowing into the active zone of cell 1.

What is claimed is:

1. An electric cell of the type comprising a first and a second parallel flexible substrates, set apart from each other at a determined distance, carrying electrodes on their opposing faces, these substrates enclosing between them a layer of sensitive material which can change its physical properties as a result of a voltage applied to the electrodes, said sensitive material being protected from contact with the atmosphere by a sealing frame which connects, in a sealed manner, peripheral parts of said substrates, said frame having a width parallel to the substrates, wherein at least the first substrate comprises on its face opposing the second substrate at least a first continuous peripheral groove into which at least a part of said sealing frame extends, the cross-section of the sealing frame being a multiple of an area equal to the product of said width multiplied by said spacing, the thickness of the sealing frame at any point being greater than or equal to said spacing and said multiple being equal to or greater than 2.

2. An electric cell according to claim 1, wherein it comprises in the internal zone delimited by the sealing frame and between the substrates, spacers which determine the spacing between the opposing faces of the substrates.

3. An electric cell according to claim 1, wherein the first substrate comprises at least a second continuous peripheral groove being parallel to the first groove, said second groove being arranged in the vicinity of said first groove and wherein a part of said sealing frame penetrates said second groove.

4. An electric cell according to claim 3, wherein the second substrate comprises at least two grooves arranged respectively substantially facing said at least first and second grooves and which are penetrated by at least a part of said sealing frame.

5. An electric cell according to claim 1, wherein the first substrate comprises a second continuous peripheral groove having a width greater than that of the first groove and being superposed onto said first groove, and wherein a part of said sealing frame penetrates said second groove.

6. An electric cell according to claim 5, wherein the second substrate comprises two superposed continuous peripheral grooves, one of the grooves having a greater width than the other, these two grooves extending facing said first and second grooves, and wherein a part of said sealing frame penetrates the two grooves.

7. An electric cell according to claim 1, wherein the second substrate comprises a groove arranged substantially facing said first groove, and which is penetrated by at least a part of said sealing frame.

8. An electric cell according to claim 1, wherein the groove or grooves comprise positive sloping lateral walls.

9. An electric cell according to claim 1, wherein the internal walls of the grooves are treated with the aid of an oxygen, nitrogen or $CF_4$ $O_2$ plasma.

10. An electric cell according to claim 1, wherein the depth of the grooves is between 0.15 and 0.2 mm.

11. An electric cell according to claim 1, wherein the spacing between the opposing faces of the substrates is between 5 and 12 µm.

12. An electric cell according to claim 1, wherein the substrates have a thickness of between 1 and 1.5 mm.

13. An electric cell according to claim 1, wherein the width of the sealing frame is between 0.5 and 10 mm.

14. An electric cell according to claim 1, wherein said multiple is between 5 and 7.

15. An electric cell as claimed in claim 1 wherein said layer of sensitive material can change its optical properties as a result of a voltage applied to the electrodes.

16. An electric cell according to claim 15, wherein said multiple is between 5 and 7.

17. An electric cell of the type comprising a first and a second parallel flexible substrates, set apart from each other at a determined distance, carrying electrodes on their opposing faces, these substrates enclosing between them a layer of sensitive material which can change its electrical properties as a result of stress or radiation passing through one of the substrates, said sensitive material being protected from contact with the atmosphere by a sealing frame which connects, in a sealed manner, peripheral parts of said substrates, said frame having a width parallel to the substrates, wherein at least the first substrate comprises on its face opposing the second substrate at least a first continuous peripheral groove into which at least a part of said sealing frame extends, the cross-section of the sealing frame being a multiple of an area equal to the product of said width multiplied by said spacing, the thickness of the sealing frame at any point being greater than or equal to said spacing and said multiple being equal to or greater than 2.

18. An electric cell according to claim 15, wherein said multiple is between 5 and 7.

19. An electric cell according to claim 17 wherein the first substrate comprises a second continuous peripheral groove having a width greater than that of the first groove and being superposed onto said first groove, and wherein a part of said sealing frame penetrates said second groove.

20. An electric cell according to claim 19, wherein the second substrate comprises two superposed continuous peripheral grooves, one of the grooves having a greater width than the other, these two grooves extending facing said first and second grooves, and wherein a part of said sealing frame penetrates the two grooves.

* * * * *